May 9, 1933.  G. A. SHAFFER ET AL  1,908,562
PAPER ROLL SUPPORT
Filed March 13, 1931
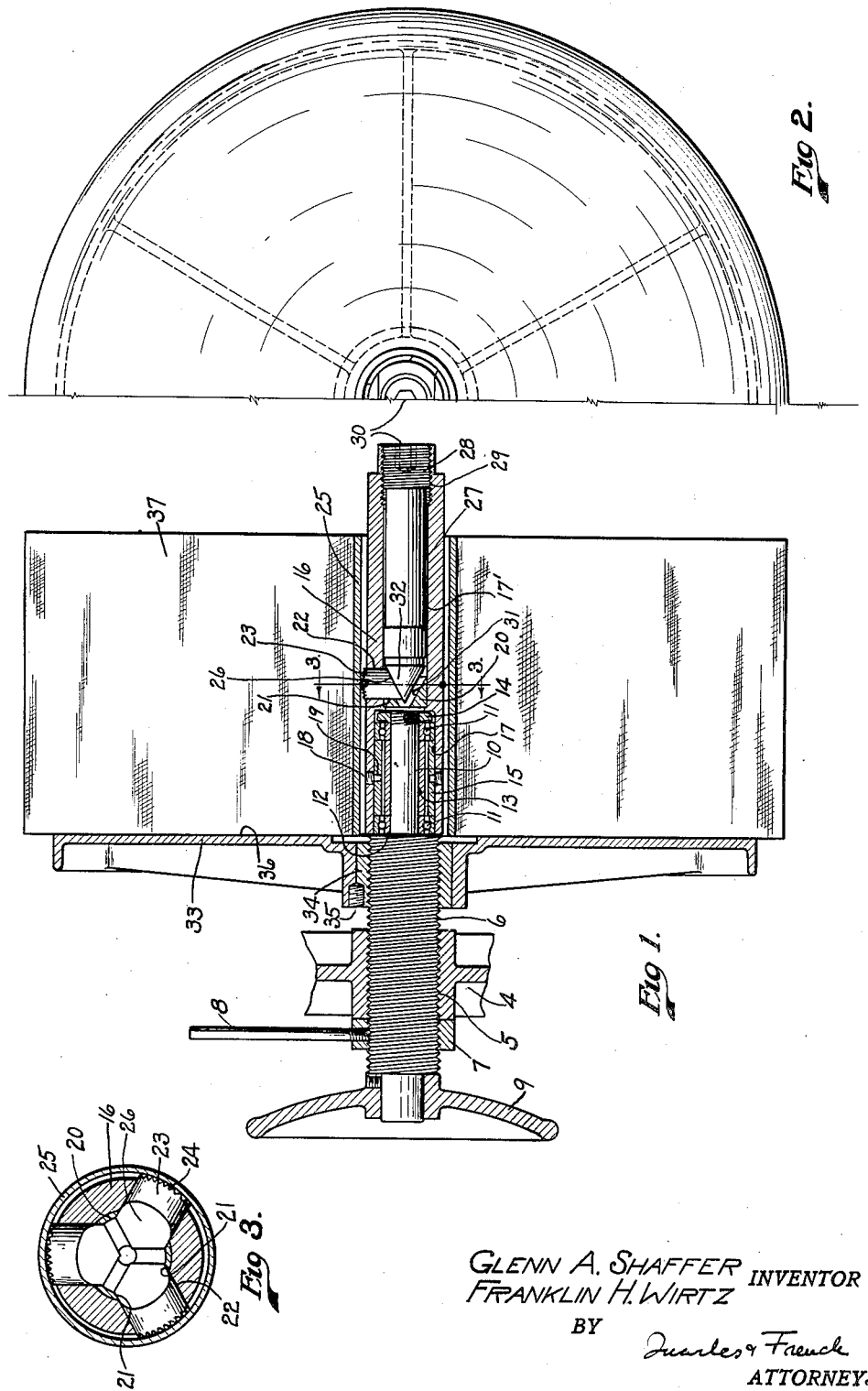
GLENN A. SHAFFER  INVENTOR
FRANKLIN H. WIRTZ
BY
Quarles & French
ATTORNEYS Patented May 9, 1933

1,908,562

UNITED STATES PATENT OFFICE

GLENN A. SHAFFER AND FRANKLIN H. WIRTZ, OF GREEN BAY, WISCONSIN, ASSIGNORS TO FORT HOWARD PAPER COMPANY, OF GREEN BAY, WISCONSIN, A CORPORATION OF WISCONSIN

PAPER ROLL SUPPORT

Application filed March 13, 1931. Serial No. 522,500.

The invention relates to supports for paper supply rolls.

In various machines that operate on paper led off from a supply roll, it is essential that the roll of paper be trued up on the support about which it rotates so that it will feed into the machine properly. The object of this invention is to provide a supporting structure for the paper roll by which the roll may be readily trued up to prevent wabbling of the roll so that the paper will come off of the roll in a straight line and also to provide for the longitudinal adjustment of the roll so as to properly feed the paper to the machine. More particularly the invention includes a supporting spindle that may be adjusted longitudinally or lengthwise, said spindle having a centering chuck journalled thereon, the jaws of which are engageable with the hollow tube about which the paper is initially wound, an adjustable truing up plate being mounted on the spindle and adapted to engage the supply roll to true up the same relative to the centering chuck so that when this adjustment is made the paper will unwind from the roll in a straight line.

The invention further consists in the several features hereinafter set forth and more particularly defined by claims at the conclusion hereof:

In the drawing Fig. 1 is a vertical sectional view through a device embodying the invention;

Fig. 2 is a front end view of the device, parts being broken away;

Fig. 3 is a detail sectional view taken on the line 3—3 of Fig. 1.

Referring to the drawing, the numeral 4 designates a portion of a relatively fixed support having a threaded bore 5 in which the threaded shank 6 of the roll supporting spindle is adjustably mounted, said spindle being held in various positions of adjustment by means of a lock nut 7 provided with an operating handle 8, said spindle having a handwheel 9 fixed to its outer end for turning it to the desired adjusted position relative to the support 4. The outer end 10 of the spindle is of reduced diameter and carries spaced ball bearing journals 11 the inner races of which are secured in position by the shoulder 12, spacing sleeve 13 and clamping nut 14. A spacing ring 15 is interposed between the outer race rings of the bearings 11.

A spindle member 16 is in the form of a sleeve having a bore 17 at one end fitting over the bearings 11 on the outer end 10 of the relatively fixed spindle and secured against endwise movement thereon by pins 18 having threaded engagement with the member 16 and projecting into opening 19 in the ring 15. This member 16 also has a bore 17' of less diameter than the bore 17 and a chuck jaw guide block 20 is mounted at the inner end of said bore 17' and has guide slots 21 formed therein alined with radially disposed jaw guide openings 22 in said member 16.

The jaws 23 are cylindrical in cross section and work through the guide slots 21 and guide openings 22 and have serrated outer ends or faces 24 adapted to engage the inner wall of the pipe or tubular core 25 on which the paper comes, said jaws having their faces curved in one plane to conform to the curvature of the pipe 25 as shown in Fig. 3, while they may be slightly curved from a median line or plane at right angles thereto so that the pipe 25 may be tilted from end to end relative to the supporting spindle for truing up the roll. The inner ends or faces 26 of the jaws are conically tapered for engagement with a tapered pin jaw-operating member 27 which is slidably and rotatably mounted in the bore 17' and has a threaded outer end 28 engaging with the threaded outer end 29 of said bore 17', said end 28 having a socket nut opening 30 formed therein for engagement with a suitable wrench for turning said member 27 inwardly or outwardly to move the jaws 23. The guide block 20 has a tapered bore 31 formed therein to allow for the operating movement of the tapered end 32 of the member 27.

A truing up plate 33 has a threaded hub member 34 secured thereto by a set screw 35, said member 34 having threaded engagement with the threaded shank 6 and adapted to be turned thereon to bring the flat face 36 of said plate against the end of the paper 37 of the supply roll during the truing up operation and to be turned back away from the same after the roll is clamped to the rotatable spindle by the jaws 23.

With this construction, with the truing up plate 33 in a position for abutting engagement with one side of the paper roll and the jaws 23 in a retracted position, the roll core 25 is moved over the supporting spindle structure from the outer end until the roll engages said plate and then member 27 is turned to move the jaws 23 outwardly into engagement with core or pipe 25. Thus the core 25 will be centered relative to the spindle structure on which it is mounted and with which it rotates and when the plate 33 is backed off the paper roll will be trued up so that it will not wabble on the spindle and the paper can then be fed off of the roll in a straight line since the action of the truing up plate in conjunction with the chuck permits the pipe 25 to be tipped endwise relative to the supporting spindle to accommodate for inaccuracies in winding of the paper on the roll. Where side disking of the paper in the supply roll due to winding conditions occurs, the longitudinal adjustment of the entire spindle structure through the operation of the handwheel 9 will serve to compensate for this condition as the paper is unwound from the roll.

We desire it to be understood that this invention is not to be limited to any particular form or arrangement of parts except in so far as such limitations are included in the claims.

What we claim as our invention is:

1. In a paper roll support, the combination of a lengthwise adjustable spindle structure including a relatively fixed spindle and a rotatable roll supporting spindle, means for holding and centering the core of the paper roll on said roll supporting spindle, and a truing up means adjustably mounted on said fixed spindle and engageable with one side of the paper roll while securing the core to said roll supporting spindle by said holding and centering means.

2. In a paper roll support, the combination of a relatively fixed spindle, a truing up plate adjustably mounted on said spindle, a rotatable spindle supported by said first named spindle, and a multi-jaw centering and holding chuck for the core of the paper roll associated with said rotatable spindle.

3. In a paper roll support, the combination of a support, a supporting spindle mounted for lengthwise adjustment relative to said support, a truing up plate adjustably mounted on said spindle, a rotatable spindle supported on said first named spindle, and a centering and holding means for the core of the paper roll carried by said rotatable spindle.

4. In a paper roll support, the combination of a relatively fixed spindle, a truing up plate adjustably mounted on said spindle, a rotatable spindle supported by said first named spindle, and a centering and holding means for the core of the paper roll carried by said rotatable spindle.

In testimony whereof, we affix our signatures.

GLENN A. SHAFFER.
FRANKLIN H. WIRTZ.